No. 888,161. PATENTED MAY 19, 1908.
G. W. HALLEY.
HOG TRAP.
APPLICATION FILED JULY 6, 1907.

Witnesses
W. Rodwell
John Powers

Inventor
George W. Halley
By Chandler & Chandler
Attorneys

UNITED STATES PATENT OFFICE.

GEORGE W. HALLEY, OF NEVADA, IOWA.

HOG-TRAP.

No. 888,161.

Specification of Letters Patent.

Patented May 19, 1908.

Application filed July 6, 1907. Serial No. 382,455.

*To all whom it may concern:*

Be it known that I, GEORGE W. HALLEY, a citizen of the United States, residing at Nevada, in the county of Story, State of Iowa, have invented certain new and useful Improvements in Hog-Traps; and I do hereby declare the following to be a full, clear, and exact description of the invention, such as will enable others skilled in the art to which it appertains to make and use the same.

This invention relates to new and useful improvements in hog traps and more particularly it comprises a structure having an inclined floor and coöperating with a tiltable frame, for holding the hog in position for any surgical operations which it may be desired to perform, such as nose ringing, or castrating.

Figure 1:
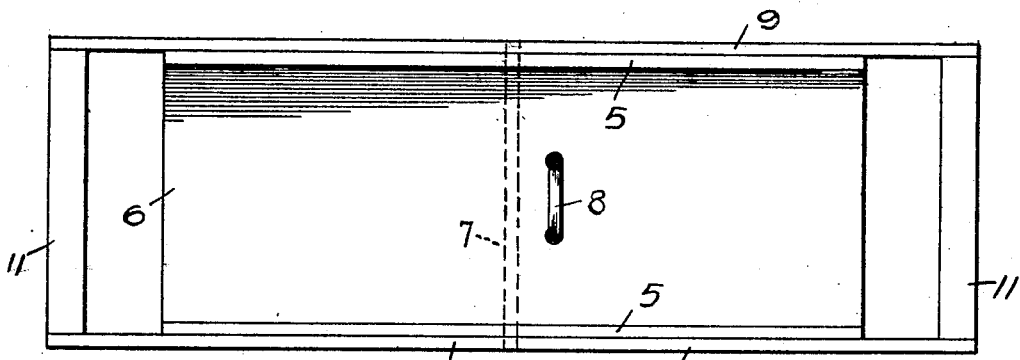
Figure 2:
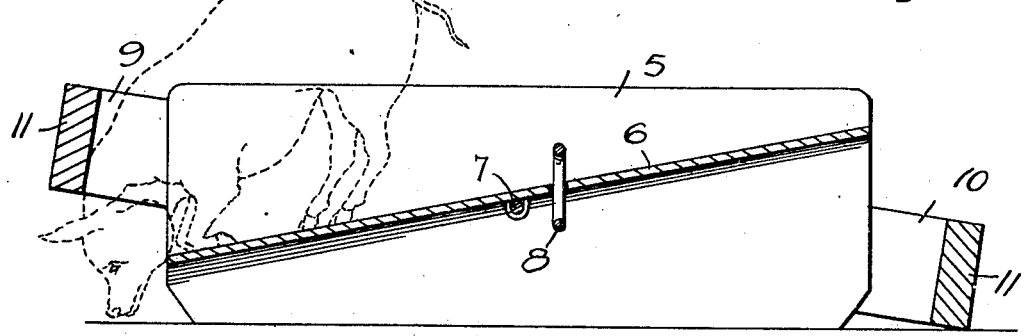
Figure 3:
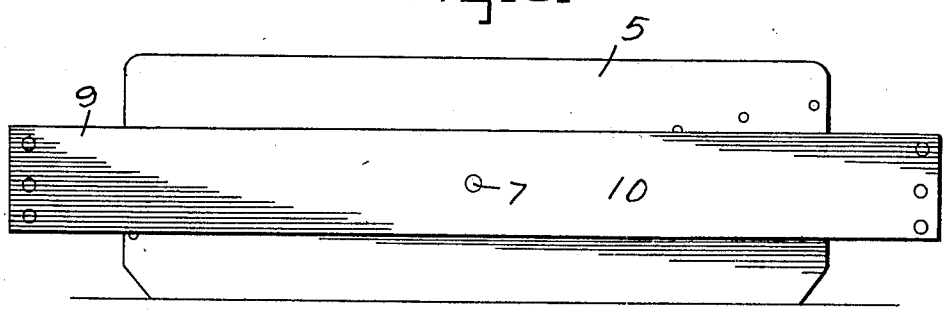

In connection with a device constructed generally as above described, the invention aims as a primary object to provide a novel construction, combination and arrangement of parts, the details of which will appear in the course of the following description in which reference is had to the accompanying drawings, forming a part of this specification, like characters of reference designating similar parts, throughout the several views, wherein:

Figure 1 is a plan view of a hog trap constructed in accordance with the present invention. Fig. 2 is a central longitudinal section thereof, showing the manner of use. Fig. 3 is a side elevation thereof.

In the accompanying drawings, the numeral 5 designates the rectangular side walls of the structure, which support an inclined floor 6, the latter being so disposed as to afford a reversible structure in which the projecting portions of the side walls on either side coöperate. Projected centrally through the side walls 5 and beneath the floor 6 is an axle 7, the ends of said axle being projected through side bars 9 of a tiltable frame 10, the latter including the end cross bars 11. Mounted in the floor 6 is a split ring 8" with which the nose of an animal is connected.

In use, the device is disposed on a suitable support or on the ground resting on the lower edges of the side walls 5. The hog, indicated by dotted lines in Fig. 2, stands upon the inclined floor 6 with its head disposed beneath the cross bar 11, above the lower end of said floor. Any attempts of the hog to leave the structure will be frustrated by virtue of the wedging action of the bar 11, since pressure of the hog will tilt the frame 10 on its pivot until the other bar 11 impinges the floor or ground. It is impossible for the hog to back out of the trap owing to the inclination of the floor 6, and the cross bar 11, of the frame 10, prevents his movement from the trap in a forward direction. Thus, the animal is held in position for the surgical operations above noted.

A hog trap constructed in accordance with the present invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

A device of the type set forth, comprising rectangular side walls, an inclined floor supported therebetween and extending approximately the length thereof, and a rectangular frame including side bars pivoted to said side walls centrally thereof, and end cross bars disposed adjacent the ends of said side walls and said inclined floor.

In testimony whereof, I affix my signature, in presence of two witnesses.

GEORGE W. HALLEY.

Witnesses:
 FRED E. HANSEN,
 J. KNUDSON.